Patented Mar. 25, 1947

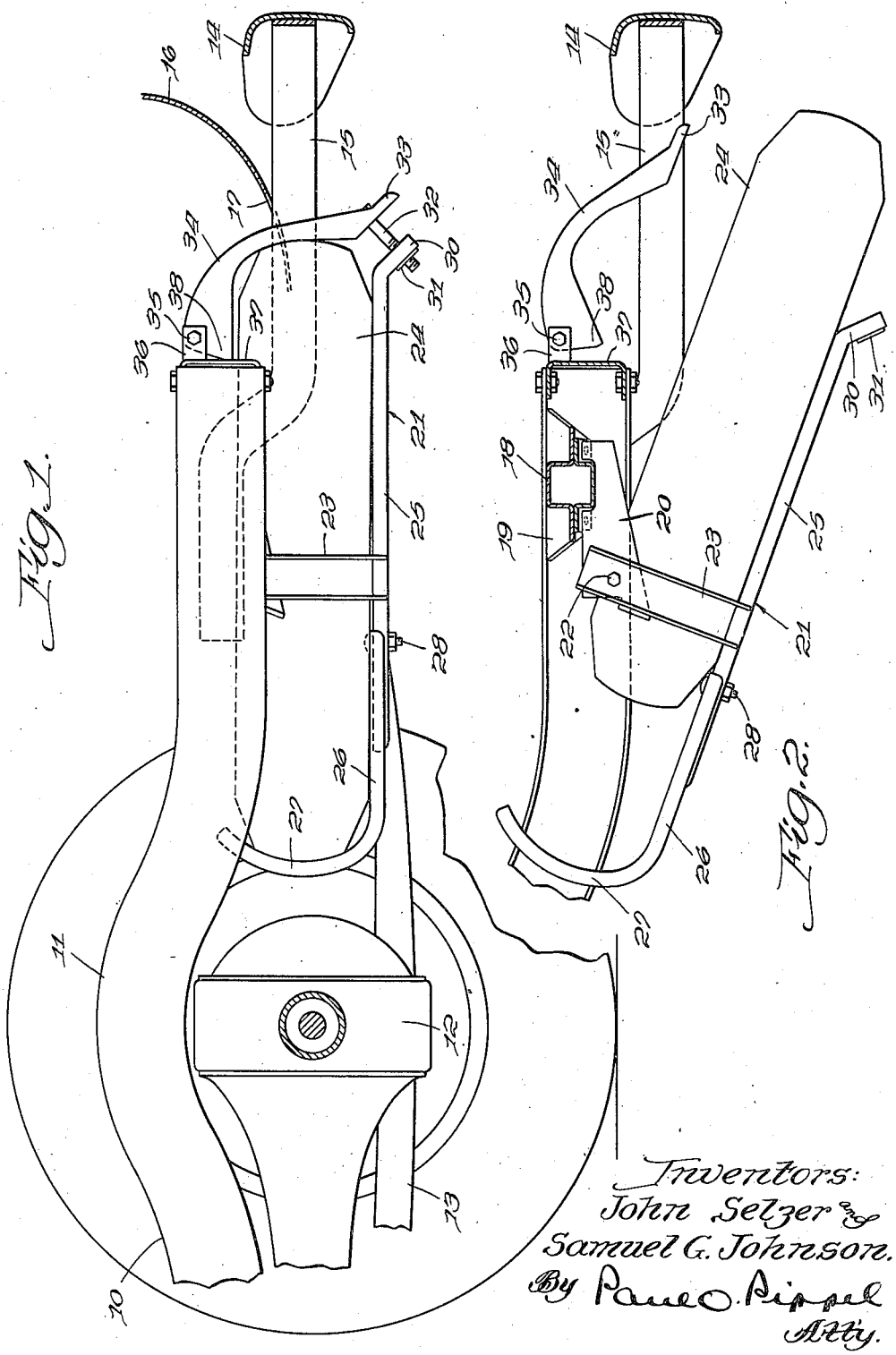

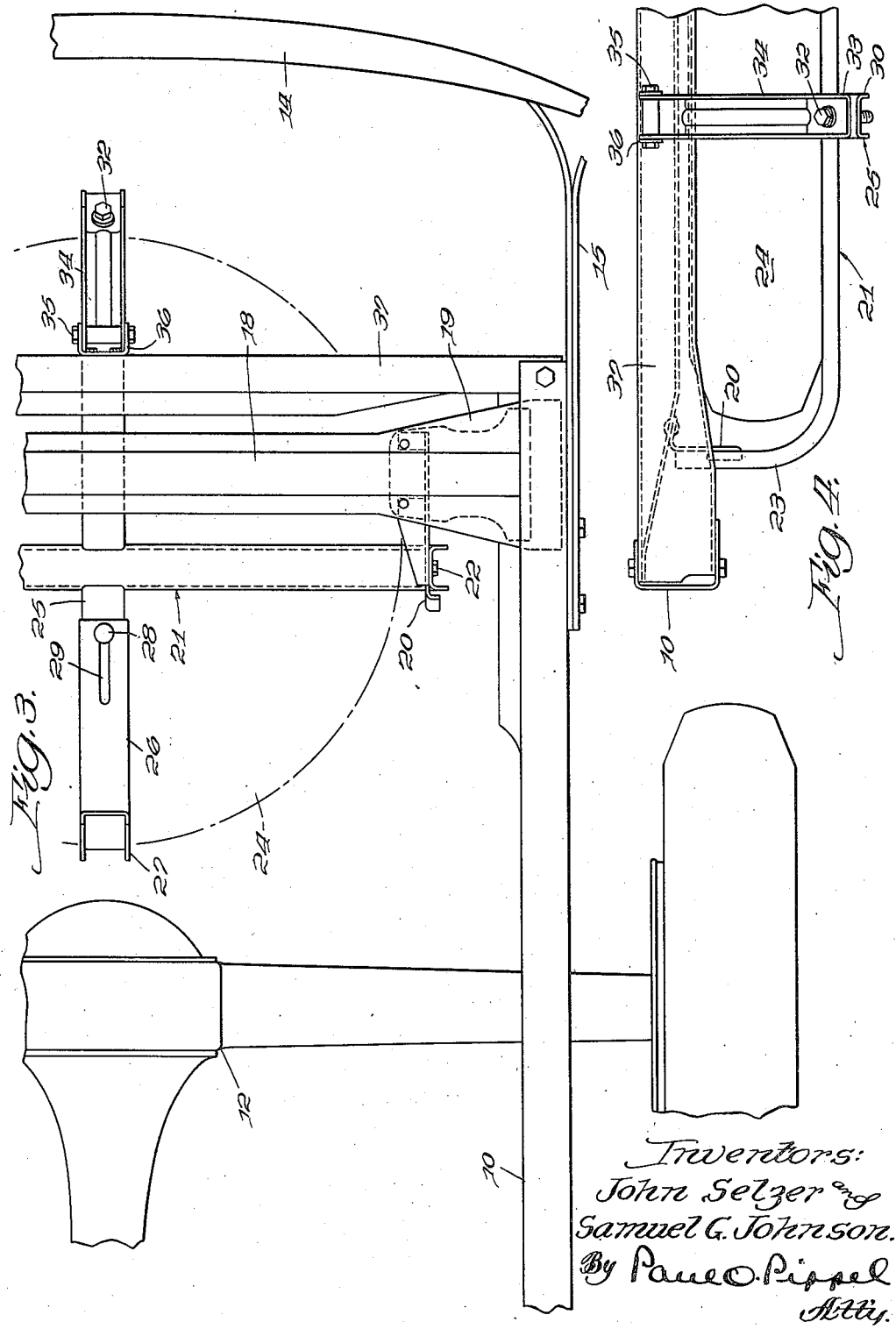

2,417,952

UNITED STATES PATENT OFFICE 2,417,952

TIRE CARRIER

John Selzer and Samuel G. Johnson, Fort Wayne, Ind., assignors to International Harvester Company, a corporation of New Jersey Application December 26, 1944, Serial No. 569,704

15 Claims. (Cl. 224—29)

1

This invention relates to a tire carrier construction for vehicles. More specifically, it relates to a spare-tire carrier construction adapted to be mounted at the rear of a conventional automotive vehicle.

It is common practice to carry a spare tire on automotive vehicles for emergency use. The present practice is to demount wheels at the hub thereby requiring a spare tire and wheel which are carried as a unit. In passenger cars these wheel and tire units are usually carried in the baggage compartment. In commercial vehicles where a maximum of loading space is required, the tire and wheel units are sometimes carried beneath the vehicle frame structure. As the vehicle frame often extends a substantial distance rearwardly of the axle, space is available beneath the frame structure for carrying a tire and wheel unit. It is to a construction of this kind that the present invention relates.

A particular problem is involved in providing a tire carrier beneath the frame of a vehicle, as it is desirable to have bumpers which correspond in height to the bumpers used on the great majority of vehicles, such as passenger cars. Such bumpers are now located at a height to make access to a tire carrier under the frame a problem. This problem applicants have solved by pivoting a tire carrier in such a manner as to permit insertion of the tire and wheel unit into the carrier under the bumper and at the same time to support the weight of the carrier and the tire and wheel in such a manner as to enable the operator to swing it upwardly into a position where it may be locked and where it is arranged with sufficient clearance for operation of the vehicle.

In the drawings,

Figure 1 illustrates the rear portion of an automotive vehicle having an extended frame as is used on light-weight delivery trucks and the like, a tire carrier embodying the invention being attached to the vehicle frame;

Figure 2 shows the tire carrier portion of Figure 1 with the tire carrier in position for inserting or removing a tire and wheel unit;

Figure 3 is a plan view of the structure shown in Figure 1;

Figure 4 is a rear end view of the structure shown in Figure 1.

A conventional vehicle frame 10 is illustrated in Figure 1, said frame having a humped portion 11 to provide clearance over a rear axle structure 12. A spring 13 is also diagrammatically illustrated to give a background for locating a tire carrier. It is understood that this tire carrier construction of the invention may be applied to any automotive vehicle having a frame extending rearwardly beyond the rear axle a sufficient distance for mounting a tire.

A conventional bumper 14 is also illustrated as being connected by brackets 15 to the frame 10. A short length of body structure 16 is indicated in Figure 1 to show the position of a commercial body on the frame 10, indicating that a portion of the body wall 17 may be cut away to provide for the tire carrier construction. It is obvious that any type of commercial body might be used which would not interfere with the parts of the tire carrier construction extending rearwardly or below the frame.

A transverse member 18 formed as a box section extends between the side members of the frame 10, being suitably connected thereto by flared end portions 19. Said portions may be welded or otherwise rigidly secured to the side members of the frame. A pair of spaced brackets 20 are secured to the member 18 at a sufficient distance apart to provide for the tire which is to be carried. A pivoted tire carrier extension, designated in its entirety by the reference character 21, is pivotally supported by bolts 22 on the brackets 20. Said tire carrier construction includes a U-shaped member 23 channel shaped in cross section to provide the desired strength. The vertical legs of said member are pivoted on the bolts 22. The horizontal portion of the member provides a transversely extending support for the tire and wheel unit 24, which will also be designated merely as the spare tire. A longitudinally extending member 25 is rigidly secured to the horizontal portion of the member 23. Said member extends forwardly, being slidably engageable with a longitudinally extending portion of a member 26. Said member also has an upwardly curved portion 27 which is adapted to engage the spare tire 24 and hold the tire against movement in a forward direction. A securing bolt 28 holds the members 25 and 26 together for adjustment. Said adjustment, made possible by a slot 29 as shown in Figure 3, adapts the carrier to tires of slightly different diameter.

The forward portion of the member 25 is provided with an angled end portion 30 to which a threaded nut 31 is permanently secured. Said nut is in a position readily engageable by a bolt 32 extending through an angled end portion 33 of a locking member 34. Said member is pivoted by a bolt 35 and a bracket 36 rigidly secured to a transverse rear frame member 37. The locking member 34 is constructed with an end portion 38 of a substantial vertical depth, said portion being shaped to engage the rear frame member 37 for limiting downward movement of the locking member. This stop positions the member 34 and assures locking of the tire in a desirable substantially horizontal position with the tire closely held to avoid excessive shifting movement during operation of the vehicle.

When an operator desires to insert a spare tire or a tire and wheel assembly into the carrier, the bolt 32 is unscrewed by a suitable wrench such as is provided for removing tire bolts. As will be noted, the bolt 32 is at such an angle that a spinner type of wrench may be readily inserted between the bumper 14 and the vehicle body 16. It will be noted that the pivot of the tire carrier construction on the bolts 22 is somewhat to the rear whereby the unit will drop by gravity into the position indicated in Figure 2. The spare tire may then be slid into position, Figure 2 showing an intermediate position of the tire. After the tire is thrust into position in engagement with the curved portion 27 of the member 26, the entire carrier and wheel assembly is tilted upwardly into the position shown in Figure 1. Due to the position of the pivot bolts 22, comparatively little effort is required to lift a relatively heavy tire and wheel unit into the position of Figure 1. The bolt 32 is then engaged by the operator's fingers sufficiently to temporarily hold the parts together. The operator then tightens the bolt 32 with a suitable wrench. In removing the tire it is only necessary to unscrew the bolt 32 following which the entire assembly pivots to the position shown in Figure 2 and the tire slides out with little effort on the part of the operator.

It is to be understood that only a preferred embodiment of applicants' invention has been illustrated, and that they claim as their invention all modifications falling within the scope of the appended claims.

What is claimed is:

1. A tire carrier construction for vehicles having a frame extending rearwardly of the vehicle, comprising a tire carrier frame structure including a U-shaped member, the legs of the U-shaped member extending vertically and being pivotally connected on a transverse horizontal axis to the vehicle frame, additional frame elements secured to said U-shaped member and including an adjustable forwardly extending member for supporting a tire and limiting movement of the tire to be carried in a forward direction and a rearwardly extending member providing a support for the tire and serving as one portion of a clamping means, and a clamping member movably connected to the vehicle frame and extending toward and for cooperation with the clamping means on the tire carrier frame structure.

2. A tire carrier construction for vehicles having a frame extending rearwardly of the vehicle, comprising a tire carrier frame structure including a U-shaped member, the legs of the U-shaped member extending vertically and being pivotally connected on a transverse horizontal axis to the vehicle frame, additional frame elements secured to said U-shaped member and including a forwardly extending member for supporting a tire and limiting movement of the tire to be carried in a forward direction and a rearwardly extending member providing a support for the tire and serving as one portion of a clamping means, and a clamping member movably connected to the vehicle frame and extending for cooperation with the clamping means on the tire carrier frame structure.

3. A tire carrier construction for vehicles having a frame extending substantially horizontally rearwardly of the vehicle, comprising a tire carrier framework including a U-shaped member, the legs of the U-shaped member extending vertically and being pivotally connected on a transverse horizontal axis to the vehicle frame, additional frame structure secured to said U-shaped member and including a forwardly extending member for supporting a tire and limiting movement of the tire to be carried in a forward direction and a rearwardly extending member providing a support for the tire and serving as one portion of a clamping means, and a clamping member movably connected to the vehicle frame and extending for cooperation with the clamping means on the tire carrier frame structure.

4. A tire carrier construction for vehicles having a frame extending substantially horizontally rearwardly of the vehicle and a bumper connected to the frame and positioned substantially below the level thereof, comprising a tire carrier framework including a U-shaped member, the legs of the U-shaped member extending vertically and being pivotally connected on a transverse horizontal axis to the vehicle frame at a horizontal level above said member, additional frame structure secured to said U-shaped member and including a forwardly extending member for supporting a tire and limiting movement of the tire to be carried in a forward direction and a rearwardly extending member providing a support for the tire and serving as one portion of a clamping means, said tire carrying structure being proportioned so that the center of gravity of the structure and a tire mounted thereon is rearwardly of and closely adjacent to the pivot axis, and a clamping member pivotally connected to the vehicle frame and extending downwardly for cooperation with the clamping means on the tire carrier frame structure.

5. A tire carrier construction for vehicles having a frame extending substantially horizontally rearwardly of the vehicle and a bumper secured to the frame spaced rearwardly from said frame and having a portion lower than said frame, comprising a tire carrier framework including a rearwardly extending member providing a support for the tire and serving as one element of a clamping means, a clamping member pivotally connected to the vehicle frame and extending downwardly to provide a clamping element cooperating with the clamping means on the tire carrier frame structure, and a threaded securing element for said clamping elements located in alignment with the space between the bumper and the frame and accessibly therethrough.

6. A tire carrier construction for vehicles having a frame extending substantially horizontally rearwardly of the vehicle and a bumper secured to the frame spaced rearwardly from said frame and having a portion lower than said frame, comprising a tire carrier framework including a U-shaped member, the legs of the U-shaped member extending vertically and being pivotally connected on a transverse horizontal axis to the vehicle frame, additional frame structure secured to said U-shaped member and including a forwardly extending member for supporting a tire and limiting movement of the tire to be carried in a forward direction and a rearwardly extending member providing a support for the tire and serving as one element of a clamping means, a clamping member pivotally connected to the vehicle frame and extending downwardly to provide a clamping element cooperating with the clamping means on the tire carrier frame structure, and a threaded securing element for said clamping elements located in alignment with the space between the bumper and the frame and accessibly therethrough.

7. A tire carrier construction for vehicles having a horizontally extending frame, said frame having a transverse rear frame member, comprising a tire carrier frame structure including a rearwardly extending member providing a support for the tire and serving as one portion of a clamping means, and a clamping member pivotally connected to the rear frame member and extending downwardly for cooperation with the clamping means on the tire carrier frame structure, said clamping member having a stop portion spaced from its pivot axis and positioned to abut the frame member when the clamping member is in its clamping position thereby providing a vertical support for the tire carrier frame structure.

8. A tire carrier construction for vehicles having a horizontally extending frame, said frame having a transverse rear frame member, comprising a tire carrier frame structure including a U-shaped member, the legs of the U-shaped member extending vertically and being pivotally connected on a transverse horizontal axis to the vehicle frame, additional frame elements secured to said U-shaped member and including a forwardly extending member for supporting a tire and limiting movement of the tire to be carried in a forward direction and a rearwardly extending member providing a support for the tire and serving as one portion of a clamping means, and a clamping member pivotally connected to the rear frame member and extending downwardly for cooperation with the clamping means on the tire carrier frame structure, said clamping member having a stop portion spaced from its pivot axis and positioned to abut the frame member when the clamping member is in its clamping position thereby providing a vertical support for the tire carrier frame structure.

9. A tire carrier construction for vehicles having a horizontally extending frame, said frame having a transverse rear frame member, comprising a tire carrier frame structure including a U-shaped member, the legs of the U-shaped member extending vertically and being pivotally connected on a transverse horizontal axis to the vehicle frame, additional frame elements secured to said U-shaped member and including a forwardly extending member for supporting a tire and limiting movement of the tire to be carried in a forward direction and a rearwardly extending member providing a support for the tire and serving as one portion of a clamping means, said tire carrying structure being proportioned so that the center of gravity of the structure and a tire mounted thereon is rearwardly of and closely adjacent to the pivot axis, and a clamping member pivotally connected to the rear frame member and extending downwardly for cooperation with the clamping means on the tire carrier frame structure, said clamping member having a stop portion spaced from its pivot axis and positioned to abut the frame member when the clamping member is in its clamping position thereby providing a vertical support for the tire carrier frame structure.

10. A tire carrier construction for vehicles having a frame extending substantially horizontally rearwardly of the vehicle and a bumper connected to the frame and positioned substantially below the level thereof, comprising a tire carrier framework including a U-shaped member, the legs of the U-shaped member extending vertically and being pivotally connected on a transverse horizontal axis to the vehicle frame, the connecting portion of the U-shaped member lying substantially horizontal and being spaced below the frame a distance at least equal to the thickness of the tire to be carried, additional frame structures secured to said U-shaped member and including a forwardly extending member for limiting movement of the tire to be carried in a forward direction and a rearwardly extending member providing a support for the tire and one portion of a clamping means, said tire carrying structure being proportioned so that the center of gravity of a tire mounted thereon is rearwardly of and closely adjacent to the pivot axis, and a clamping member pivotally connected to the vehicle frame and extending downwardly for cooperation with the clamping member on the tire carrier frame structure whereby when the tire is inserted in the carrier structure said structure may be pivoted upwardly with a relatively small force just sufficient to overcome the off-balance of the pivotal mounting and clamped to the clamping member for holding the carrier in position.

11. A tire carrier construction for vehicles having a frame extending substantially horizontally rearwardly of the vehicle, comprising a tire carrier framework including a U-shaped member, the legs of the U-shaped member extending vertically and being pivotally connected on a transverse horizontal axis to the vehicle frame, the connecting portion of the U-shaped member lying substantially horizontal and being spaced below the frame a distance at least equal to the thickness of the tire to be carried, additional frame structures secured to said U-shaped member and including a forwardly extending member for limiting movement of the tire to be carried in a forward direction and a rearwardly extending member providing a support for the tire and one portion of a clamping means, said forwardly and rearwardly extending members being proportioned to hold a tire and rim assembly in substantially balanced position with respect to the pivot axis of the U-shaped member and a clamping member pivotally connected to the vehicle frame and extending downwardly for cooperation with the clamping member on the tire carrier frame structure whereby when the tire is inserted in the carrier structure said structure may be pivoted upwardly with a relatively small force just sufficient to overcome any off-balance of the pivotal mounting and clamped to the clamping member for holding the carrier in position.

12. A tire carrier construction for vehicles having a frame extending substantially horizontally rearwardly of the vehicle and a bumper connected to the frame spaced longitudinally therefrom, comprising a tire carrier framework including a U-shaped member, the legs of the U-shaped member extending vertically and being pivotally connected on a transverse horizontal axis to the vehicle frame, the connecting portion of the U-shaped member lying substantially horizontal and being spaced below the frame a distance at least equal to the thickness of the tire to be carried, additional frame structures secured to said U-shaped member and including a forwardly extending member for limiting movement of the tire to be carried in a forward direction and a rearwardly extending member providing a support for the tire and one element of a clamping means, said tire carrying structure being proportioned so that the center of gravity of a tire mounted thereon is rearwardly of and closely adjacent to the pivot axis, a clamping member pivotally connected to the vehicle frame and extending downwardly to provide a clamping element cooperating with the clamping element on the tire carrier frame structure whereby when the tire is inserted in the carrier structure said structure may be pivoted upwardly with a relatively small force just sufficient to overcome the off-balance of the pivotal mounting and clamped to the clamping element on the frame for holding the carrier in position, and a threaded securing element for said clamping elements located in alignment with the space between the bumper and the frame and accessible therethrough.

13. A tire carrier construction for vehicles having a frame extending substantially horizontally rearwardly of the vehicle at a low level and a bumper connected to the frame, comprising a tire carrier framework comprising a U-shaped member, the legs of the U-shaped member extending vertically and being pivotally connected on a transverse horizontal axis to the vehicle frame, the connecting portion of the U-shaped member lying substantially horizontal and being spaced below the frame a distance equal to the thickness of the tire to be carried, additional frame structures secured to said U-shaped member and including a forwardly extending member for limiting movement of the tire to be carried in a forward direction and a rearwardly extending member providing a support for the tire, said member being bent downwardly at its rear end to form one element of a clamping means, said tire carrying structure being proportioned so that the center of gravity of a tire mounted thereon is rearwardly of the pivot axis, and a clamping member pivotally connected to the vehicle frame on a transverse axis and being swingable downwardly, said member having a bent end portion to provide a clamping element for cooperation with the clamping element on the tire carrier frame member whereby when the tire is inserted in the carrier structure said structure may be pivoted upwardly with a relatively small force just sufficient to overcome the off-balance of the pivotal mounting, said clamping member being provided with a stop portion abutable with the vehicle frame to limit downward movement of the clamping member whereby said member acts as a vertical support for the tire carrier structure, a threaded element being provided for securing the clamping elements together, said element being bent to mate with each other and the angle of their position being such as to provide straight line access to the threaded element through the space between the bumper and the frame.

14. A tire carrier construction for vehicles having a frame extending substantially horizontally rearwardly of the vehicle at a low level and a bumper connected to the frame and positioned substantially below the level of the frame, comprising a tire carrier framework comprising a U-shaped member, the legs of the U-shaped member extending vertically and being pivotally connected on a transverse horizontal axis to the vehicle frame, the connecting portion of the U-shaped member lying substantially horizontal and being spaced below the frame a distance equal to the thickness of the tire to be carried, additional frame structures secured to said U-shaped member and including a forwardly extending member for limiting movement of the tire to be carried in a forward direction and a rearwardly extending member providing a support for the tire, said member being bent downwardly at its rear end to form one element of a clamping means, said tire carrying structure being proportioned so that the center of gravity of a tire mounted thereon is rearwardly of the pivot axis, and a clamping member pivotally connected to the vehicle frame on a transverse axis and being swingable downwardly, said member having a bent end portion to provide a clamping element for cooperation with the clamping element on the tire carrier frame member whereby when the tire is inserted in the carrier structure said structure may be pivoted upwardly with a relatively small force just sufficient to overcome the off-balance of the pivotal mounting, said clamping member being provided with a stop portion abutable with the vehicle frame to limit downward movement of the clamping member whereby said member acts as a vertical support for the tire carrier structure, a threaded element being provided for securing the clamping elements together, said element being bent to mate with each other and the angle of their position being such as to provide straight line access to the threaded element through the space between the bumper and the frame.

15. A tire carrier construction for vehicles having a frame extending substantially horizontally rearwardly of the vehicle at a low level and a bumper connected to the frame, comprising a tire carrier framework comprising a U-shaped member, the legs of the U-shaped member extending vertically and being pivotally connected on a transverse horizontal axis to the vehicle frame, the connecting portion of the U-shaped member lying substantially horizontal and being spaced below the frame a distance generally equal to the thickness of the tire to be carried, additional frame structures secured to said U-shaped member and including a forwardly extending member for limiting movement of the tire to be carried in a forward direction and a rearwardly extending member providing a support for the tire, said member at its rear end being formed as one element of a clamping means, a clamping member connected to the vehicle frame for vertical movement with respect thereto and having an end portion to provide a clamping element for cooperation with the clamping element on the tire carrier frame member whereby when the tire is inserted in the carrier structure said structure may be moved upwardly, and a securing element for securing the clamping elements together, said clamping elements being formed to mate with each other and the angle of their position being such as to provide straight line access to the securing element through the space between the bumper and the frame.

JOHN SELZER.
SAMUEL G. JOHNSON.

REFERENCES CITED

The following references are of record in the file of this patent:

UNITED STATES PATENTS

| Number | Name | Date |
|---|---|---|
| 1,672,356 | Wasserfallen | June 5, 1928 |
| 1,913,835 | Golike | June 13, 1933 |
| 2,028,945 | Morrison | Jan. 28, 1936 |
| 2,052,970 | Erbeck | Sept. 1, 1936 |
| 2,034,834 | Robinson | Mar. 24, 1936 |
| 1,761,916 | Hebner | June 3, 1930 |
| 1,761,920 | Hunt, et al. | June 3, 1930 |
| 1,813,094 | Appel | July 7, 1931 |